(12) United States Patent
Mäkelä et al.

(10) Patent No.: US 6,898,503 B2
(45) Date of Patent: May 24, 2005

(54) METHOD AND APPARATUS FOR DETERMINING POSITION OF MINING MACHINE

(75) Inventors: Hannu Mäkelä, Helsinki (FI); Thomas Von Numers, Grankulla (FI)

(73) Assignee: Sandvik Tamrock Oy, Tampere (FI)

( * ) Notice: Subject to any disclaimer, the term of this patent is extended or adjusted under 35 U.S.C. 154(b) by 25 days.

(21) Appl. No.: 10/704,554

(22) Filed: Nov. 12, 2003

(65) Prior Publication Data
US 2004/0138799 A1 Jul. 15, 2004

Related U.S. Application Data

(63) Continuation of application No. PCT/FI02/00406, filed on May 13, 2002.

(30) Foreign Application Priority Data

May 14, 2001 (FI) .............................................. 20011006

(51) Int. Cl.$^7$ ............................................... B60B 39/00
(52) U.S. Cl. .......................................... 701/50; 701/71
(58) Field of Search .............................. 701/50, 29, 33; 33/288, 203.18; 299/1.3; 318/580

(56) References Cited

U.S. PATENT DOCUMENTS

| 5,081,585 A | 1/1992 | Kurami et al. |
| 5,155,684 A | 10/1992 | Burke et al. |
| 5,310,249 A | * 5/1994 | Sugden et al. ............... 299/1.3 |
| 5,313,711 A | * 5/1994 | Kling et al. .................. 33/288 |
| 5,530,330 A | 6/1996 | Baiden et al. |
| 5,999,865 A | 12/1999 | Bloomquist et al. |
| 5,999,866 A | 12/1999 | Kelly et al. |

FOREIGN PATENT DOCUMENTS

| EP | 0788044 A1 | 8/1997 |
| EP | 0 952 427 A2 | 10/1999 |

* cited by examiner

*Primary Examiner*—Marthe Y. Marc-Coleman
(74) *Attorney, Agent, or Firm*—Burns, Doane, Swecker & Mathis, L.L.P.

(57) ABSTRACT

A method and an apparatus for determining the position of a mining machine as its wheels skid with respect to the underlying surface. In the method, at least one detector detecting the operation of transmission detects skidding of at least one wheel with respect to the underlying surface, whereupon determination of the position by means of the rotation of the wheels and the direction of travel is interrupted. The apparatus includes at least one detector for detecting the operation of the transmission, the detector detecting the skidding of at least one wheel with respect to the underlying surface.

20 Claims, 2 Drawing Sheets

US 6,898,503 B2

METHOD AND APPARATUS FOR DETERMINING POSITION OF MINING MACHINE

CROSS-REFERENCE TO RELATED APPLICATIONS

This application is a continuation of international PCT application Ser. No. PCT/FI02/00406, filed May 13, 2002, which was published in English as WO 02/093,282 A1 on Nov. 21, 2002, and which is incorporated by reference.

TECHNICAL FIELD

The invention relates to a method for determining position of a mining machine during skidding of at least one of the machine's wheels with respect to the underlying surface, the method comprising determining the position of the mining machine during its normal movement by measuring the distance the machine has moved in proportion to the rotation of the wheels and the direction in which the machine moves, further determining the position of the machine at suitable intervals over the route along which the machine is moving by determining profiles of wall surfaces surrounding the machine and by comparing the obtained wall surface profiles with wall profiles of corresponding points stored in a memory of control equipment of the mining machine, and correcting, if required, the position data obtained from the rotary motion of the wheels and the directions of travel of the machine by using the position data obtained from the determination of the wall profiles.

The invention further relates to an apparatus for implementing the method according to claim 1, the apparatus comprising control means for controlling a mining machine, the control means including means for determining the position of the mining machine by measuring the rotary motion of the wheels and the direction of travel of the machine, and measuring means for determining profiles of wall surfaces surrounding the route of the machine at least at predetermined intervals and for storing the profiles in a memory, and means for comparing the wall surface profiles measured during the movement of the machine with the wall surface profiles stored in the memory and for correcting the data on the position of the mining machine on the basis of the position data obtained from the comparison of the wall surface profiles.

BACKGROUND OF THE INVENTION

Processing of material and other mechanical operations related to mining are being automated to a greater extent in order to minimize costs. As a result, e.g. loaders have been developed, which follow automatically given commands and travel along a specific route to fetch broken rock from one place and unload the rock from the bucket to another place. In the prior art arrangement, the loader moves automatically between the locations and also empties the load from the bucket automatically, but during loading a remote operator controls the filling of the bucket via a telecommunications network since fully automatic loading of the bucket with the prior art methods is the prior art methods is not yet as efficient as manually controlled loading. When the loader moves, it should follow the predetermined route rather closely in order to remain within the allowed driving area and to be able to carry out the required operations correctly. The prior art teaches arrangements, based on dead reckoning and modelling and observation of the environment, for controlling the movement and determining the position of the machine.

The method of dead reckoning utilizes rotary movement of a component of the transmission equipment, typically the wheels, by measuring the distance travelled by the apparatus in proportion to the rotation of the wheels. The dead reckoning method also takes into account steering angles, i.e. either the steering angles of the turning wheels or the steering angle of the frame, so that the distance and direction of travel of the apparatus can also be calculated while the apparatus is turning. Although the obtained data is rather useful, it does contain some errors, wherefore the position of the apparatus must be checked in some other manner at suitable intervals. For this purpose the prior art teaches an arrangement where the surfaces surrounding the route along which the apparatus is moving, i.e. the shapes of the surfaces and the distance thereof from the intended route, are determined and stored in a memory by manually guiding the apparatus along a new route to be later driven automatically and by simultaneously determining the surfaces. The surface profile thus determined can be utilized in the determination of the exact position of the apparatus when it is moving automatically along the route. In this situation the actual calculation of the movement is based on the dead reckoning method in the prior art manners described above, which also includes observation of the surfaces surrounding the apparatus. The profile data from the determination of the surfaces is compared to the profile data stored in the memory, whereupon the longitudinal and transverse position of the apparatus with respect to the desired route can be determined accurately. Consequently, the corrective movements required to guide the apparatus back to the desired route can be performed automatically and the deviating position data obtained by the dead reckoning method can be corrected. Repeating the aforementioned measures at suitable, e.g. predetermined, intervals makes the loader move rather closely along a desired route. In addition to loaders, such an arrangement for guiding a machine along a specific route and for determining the position of the machine by means of the dead reckoning method and determination of the profiles of the surrounding wall surfaces can be used in connection be used in connection with other mining machines, such as haulage vehicles, drilling apparatuses, etc. For example in the present application and the claims, a mining machine refers to all possible machines and vehicles moving in a mine.

However, the aforementioned measuring method is not sufficiently accurate for loaders during loading, when the bucket is being filled with broken rock. To achieve maximum loading of the bucket, or a maximum transport capacity, it is not sufficient to merely drive the bucket into the pile of broken rock but the bucket must be guided and turned in various ways. Since the bucket must also be pushed into the pile of broken rock at a high speed, the wheels of the loader tend to skid and the loader may also deviate from the usual direction of travel during the filling of the bucket. In such a situation, the dead reckoning method is subjected to errors, which cause problems in the automatic control of the apparatus. Furthermore, at the training stage the environment of the loading site and particularly the direction of the material to be loaded may not have been observed and stored in full in the memory, since these matters usually change as the loading proceeds. Correspondingly, problems also occur in the determination of the position of other mining machines by means of the dead reckoning method when one or more of the vehicles' wheels skid with respect to the underlying surface, thus causing errors in the determination.

SUMMARY OF THE INVENTION

An objective of the present invention is to provide a method and an apparatus enabling more accurate determination of the position of a mining machine as its wheels skid with respect to the surface.

The method according to the invention is characterized by detecting, during movement of the mining machine, skidding of at least one wheel of the machine with respect to the underlying surface by at least one detector, such as a sensor, detecting the operation of the transmission of the mining machine, interrupting the determination of the position of the machine by means of the rotation of the wheels and the direction of travel of the machine from the moment of detection of the skidding for the entire duration thereof, and determining the position of the machine solely by determining the profile of at least one wall surface surrounding the machine and by comparing the obtained wall surface profile to the stored profiles of the known wall surfaces surrounding the machine.

The apparatus according to the invention is characterized in that the apparatus comprises at least one detector, such as a sensor, detecting the operation of the transmission, the detector detecting skidding of at least one wheel with respect to the underlying surface, and that the control means are arranged to interrupt the determination of the position of the machine by means of the rotary motion of the wheels and the direction of travel of the mining machine as soon as the detector detects the skidding, and correspondingly to determine the position of the machine solely by comparing the wall surface profiles obtained from the measuring means with the wall surface profiles stored in the memory.

An essential idea of the invention is that predefined parameters are used to detect a state where at least one wheel of the mining machine starts skidding, whereupon the dead reckoning system based on the rotary movement of the transmission equipment is switched off. The parameters include e.g. the speed of rotation of the engine, data about the selected gear of the gear system, and the distance travelled by the machine, determined from the transmission on the basis of the rotation of the wheels. For example when the lowest or the second lowest gear is being used and a torque converter of the transmission system is able to slide to a sufficient extent, measurement of the distance by means of the transmission sensor can be terminated and another measurement method can be introduced according to the invention. According to another essential idea of the invention, determination of the position of the mining machine requires the shape, distance and direction of at least one wall surface surrounding the mining machine to be determined and compared to the known wall profiles stored in the memory, so that when the wheels stop skidding, the position of the mining machine with respect to the determined environment will be accurately known. According to a preferred embodiment, the shape of the wall profile used in the determination of the position of the mining machine and the location of the wall profile with respect to the known position of the mining machine are determined and stored in the memory after the machine has moved a predetermined distance forward or its turning angle has changed to a degree equalling at least a predetermined angle. As a result, the wall profile thus stored becomes the new reference profile, wherefore the determination of the position carried-out by means of the comparison based on a principle of correlation will continuously provide as accurate results as possible.

The invention provides the advantage that when the wheels of the mining machine start skidding, the distance the machine has travelled and the direction and position thereof can be determined rather accurately in order to provide reliable automatic control of the machine during its return movement and a subsequent movement in the same direction. Another advantage that is evident particularly with loaders is that although transportation and unloading are preformed automatically, filling of the bucket is still remote-controlled manually, and the remote operator controlling the filling can thus concentrate solely on the filling. Furthermore, as soon as the filling of the bucket can be automated, the system will be ready for use and able to control the entire automatic operating cycle of a loader.

BRIEF DESCRIPTION OF THE DRAWINGS

The invention will be described below in more detail in connection with preferred embodiments and with reference to the accompanying drawings, in which.

DETAILED DESCRIPTION OF THE PREFERRED EMBODIMENTS

Figure 1:
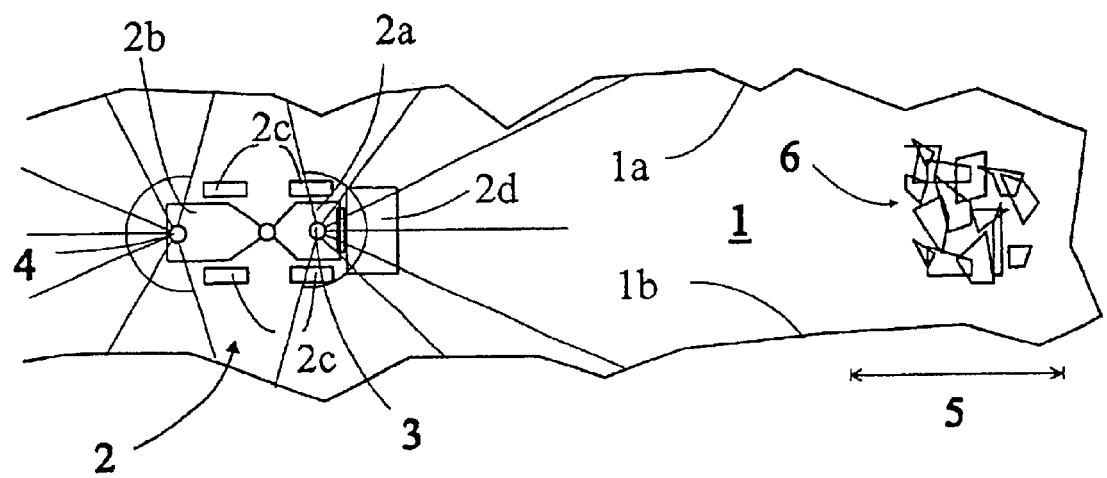
FIG. 1 shows a typical mining machine, in this case a loader, in normal run approaching a loading site.

FIG. 1 shows a situation where a mining machine, in this case a loader 2, moving in a tunnel 1 approaches a loading site containing broken rock. The tunnel 1 is provided with lateral wall surfaces 1a and 1b. The loader 2 is typically of the frame-steered type and comprises a front frame 2a and a rear frame 2b, a pivoting joint between the frames, and wheels 2c fixed to each frame in a non-rotating manner. The loader is controlled by pivoting the front and the rear frame 2a, 2b with respect to one another. The front frame 2a is provided with a bucket 2d, onto which broken rock is loaded for transportation.

The top of the loader 2 is provided with measuring means 3, 4 arranged suitably to inspect the surfaces surrounding the route along which the loader 2 is moving, e.g. in a tunnel such surfaces are typically the wall surfaces 1a, 1b. The shape or profile and the distance of the surfaces from the loader 2 are determined as the loader moves along the route. The measuring means 3, 4 can be any devices transmitting and receiving radiation, such as laser scanners or the like, or video cameras. Data obtained by the measuring means is processed with suitable programs to constitute information on the wall surface. The figure further shows a loading site denoted by reference numeral 5 and containing broken rock 6 at the end thereof.

Measuring means 3 located on the front frame 2a of the loader are used e.g. to determine the wall surfaces 1a, 1b in front of the loader, i.e. they scan the walls in front of them at an angle of about 180°, preferably slightly more than 180°, on both sides of the loader's route of travel. When the profile data scanned during the movement of the loader is compared to the profile data stored in the memory, it is easy to calculate the accurate position of the loader and to determine the corrective measures possibly required to guide the loader to the desired route, if it has deviated therefrom. Measuring means 4 in turn are located on the rear frame 2b of the loader. They are used to determine the wall surfaces located behind the loader and they are also needed during a loading situation to be described below, where the dead reckoning method based on the rotary movement of the transmission equipment, such as the wheels, is not useful due to skidding of one or more wheels with respect to the underlying surface. Measuring means 4 scan the wall surfaces at an angle of about 180° on both sides of the loader, thus providing an image of the wall surfaces behind the loader. In practice, the measuring means 3, 4 preferably measure the wall profile at an angle of more than 180°, so that the measurement areas partly overlap on each side and can thus be integrated in a more reliable manner.

Measurement of the movement and position of the loader in normal run is carried out by means of data obtained from rotary motion that is proportional to the rotation of the wheels, the data indicating the average distance the loader has moved. Sensors are thus used to measure e.g. the rotary movement of the axis of rotation of the wheels or the transmission axis, which is directly proportional to the distance the loader has moved during the rotation of the wheels. The steering angle between the front and the rear frame of the loader is also measured in order to calculate the distance the loader has travelled and its position in curved movements. Furthermore, in addition to or instead of the steering angle, determination of the direction can utilize a gyroscope, which is known per se in such a case. The gyroscope provides the direction of the loader in proportion to a direction that is fixed with respect to the earth, and therefore the steering angle between the frames is not needed to detect the deviation angle or the direction of travel. These values can be used to determine rather accurately the position of the loader along a predetermined predetermined route programmed into the memory of the loader's control system. However, since this method is subject to errors for different reasons, the control system of the loader is trained to know the route by first driving the loader along the future route under manual control. The profiles of the wall surfaces 1a, 1b along the route are simultaneously determined preferably at suitable intervals or over the entire route, if required, and they are stored in the memory as reference values for automatic movement. When the loader 2 moves under automatic control of the control system, the distance it has travelled and the position thereof are determined by the aforementioned dead reckoning method by using the rotary movement of the wheels and the direction of travel and/or steering angles. Measuring means 3 simultaneously determine the wall surface profile on both sides of the loader in front of it. Measuring means 4 correspondingly measure the wall surface profile on both sides of the loader behind it. The control system compares the measured wall surface profiles to the profiles stored in the memory and corrects, if required, the position of the loader based on the dead reckoning method and guides the loader to the desired route to rectify the deviations from the position detected on the basis of the comparison.

Figure 2:
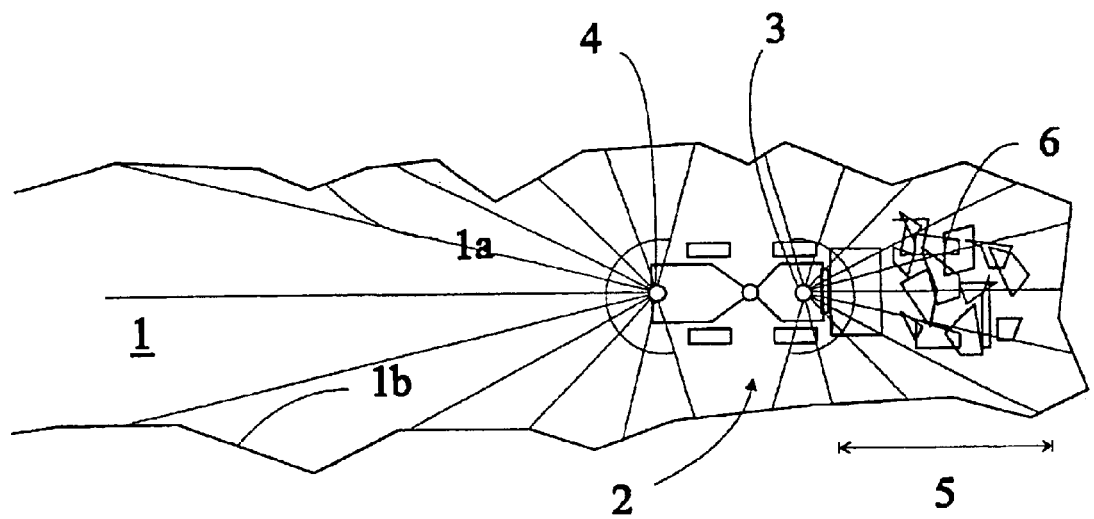
FIG. 2 shows the loader during loading.

FIG. 2 shows a situation where the loader 2 has arrived at the loading site 5. In this situation the bucket 2d of the loader 2 is lowered for filling. This is presently performed manually through remote control, such that when the loader is approaching the loading site 5 it is transferred under the control of a remote operator via a telecommunications connection. In principle the loading could also be carried out fully automatically, but at the moment manual filling of the bucket is still more efficient than the various automatic filling arrangements that have been experimented. At the start of the filling, the loader pushes the bucket 2d into the broken rock 6, whereupon at least one of the wheels 2c can skid at some point with respect to the underlying surface. When the sensors of the control equipment detect the skidding, the dead reckoning method based on the rotation of the wheels is switched off and measuring means 4 determine the wall surfaces, i.e. the shape and distance of the walls that are visible at an angle of slightly more than 180° behind the loader 2, whereafter these variables are stored in the memory. In practice the measuring means 4 at the loader's rear end start determining the wall surfaces already before the skidding of the wheels is detected, so that reliable detection of the position is available and after the skidding has started, the position of the the loader can be checked according to the aforementioned measured profile. While the bucket is being filled, the deviation angle of the loader can be detected e.g. by means of a separate gyroscope located in the loader. The method further takes into account the steering angle, i.e. the steering angle of the centre joint of the loader, which is used to determine the position of the loader's front and rear parts. The deviation angle can also be calculated by taking into account the wall surfaces determined by the measuring means 4, since a change in profiles of successive measured wall surfaces also indicates possible turning of the rear 2b of the loader. In this manner the position of the loader during loading can be determined rather accurately. Measuring means 3 located at the front of the loader can be simultaneously used to measure the profiles of the wall surfaces in front of the loader, the profiles also being stored in the memory. When the geometry and the position of the loader are known along with the steering angle between the front and the rear frame, surface features of an unidentified area that will possibly be part of the loader's future route can be stored and used as reference profiles.

During determination of the position, changes naturally occur as the loader moves forward and/or turns to ensure proper filling of the bucket. In such a case, reliable determination of the position preferably requires that the reference surface in use be changed after the loader has travelled a predetermined distance forward or turned a predetermined degree with respect to the original reference surface. This is carried out by measuring the known wall surface profile used as the reference surface with respect to the current position of the loader and by using the obtained measured profile as the reference surface of the loader until a need to determine a new reference surface arises.

When the bucket is full of broken rock, the loader starts reversing and the dead reckoning method based on the rotary movement of the wheels can simultaneously be activated to determine the position of the loader on the way back. Consequently, the measuring means 3, 4 are again used to determine the wall profiles of the side walls 1a, 1b and to provide necessary data for correcting the deviations in the position obtained by means of the dead reckoning method.

Figure 3:
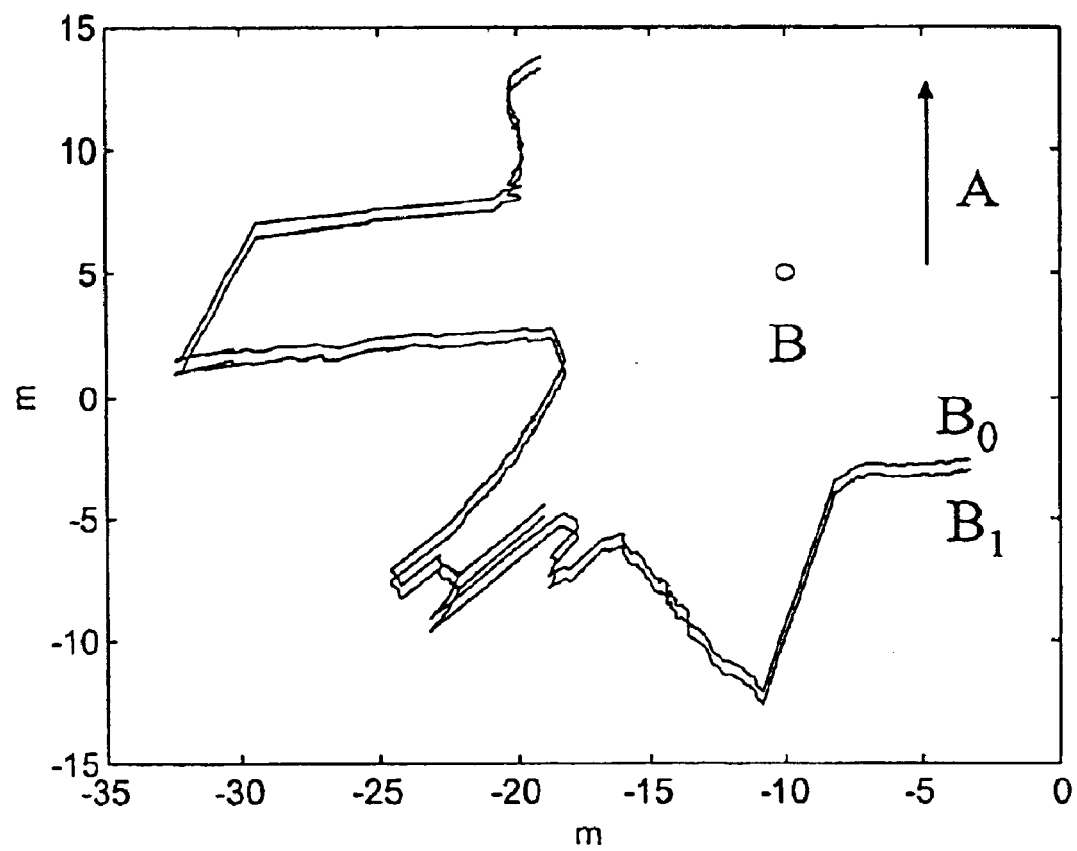
FIG. 3 shows wall profiles measured in an actual measurement situation with respect to the position of the loader.

FIG. 3 shows a result obtained in an actual measurement situation, where the loader has moved 0.5 meters in direction A denoted in the figure with respect to the wall surface that is being measured, i.e. the reference surface. The profiles are superimposed and the loader is located at circle B, the figure thus showing how the profiles substantially correspond to one another in shape. Profile $B_0$ has been measured first and profile $B_1$ has been measured after the loader has moved 0.5 meters forward in the direction indicated by arrow A.

The invention is described in the above specification and shown in the drawings only by way of an example and it is not restricted thereto in any way. Therefore, instead of a loader the mining machine can be any load-carrying vehicle, such as a dumper or a drilling apparatus, which moves in a mine so that its position must be known accurately for the purpose of controlling and/or using the apparatus. The essential factor is that when the mining machine moves normally, its position along the route is measured primarily by using the dead reckoning method that is proportional to the rotation of the wheels and the steering angle or the direction of travel, but if even one of the machine's wheels starts skidding with respect to the surface, the position is determined by means of a wall profile measured behind the mining machine preferably for example at an angle of 180°, i.e. at an angle of >90° on both sides of the longitudinal axis of the machine's rear part. Even though the specification and the drawings show the use of two separate measuring means for determining the wall profiles in front of and behind the vehicle, it is also possible to use more than two measuring means placed suitably to measure a specific area around the vehicle, or only a single measuring means able to determine the profiles of the wall surfaces surrounding the vehicle at an angle of for example 360°.

What is claimed is:

1. A method for determining position of a mining machine during skidding of at least one of the machine's wheels with respect to the underlying surface, the method comprising:

determining the position of the mining machine during its normal movement by measuring the distance the machine has moved in proportion to the rotation of the wheels and the direction in which the machine moves, further determining the position of the machine at suitable intervals over the route along which the machine is moving by determining profiles of wall surfaces surrounding the machine and by comparing the obtained wall surface profiles with wall profiles of corresponding points stored in a memory of control equipment of the mining machine, and correcting, if required, the position data obtained from the rotary motion of the wheels and the directions of travel of the machine by using the position data obtained from the determination of the wall profiles, detecting, during movement of the mining machine, skidding of at least one wheel of the machine with respect to the underlying surface by at least one detector, detecting the operation of the transmission of the mining machine, interrupting the determination of the position of the machine by means of the rotation of the wheels and the direction of travel of the machine from the moment the skidding is detected for the entire duration of the skidding, and determining the position of the machine solely by determining the profile of at least one wall surface surrounding the machine and by comparing the obtained wall surface profile to the stored profiles of the known wall surfaces surrounding the machine.

2. A method according to claim 1, including measuring said wall surface profile before detecting the skidding of said at least one wheel with respect to the underlying surface.

3. A method according to claim 1, including interrupting the measurement of the position of the mining machine by means of the rotary motion of the wheels and the direction of travel substantially immediately after said wall surface profile has been measured and the position of the machine has been determined based on the measured profile.

4. A method according to claim 1, wherein the mining machine is a loader, and said wall surface profile is determined after the machine has arrived at the loading site and a gear system of the machine's transmission equipment has been switched to a predetermined gear while the loader is moving straight forward.

5. A method according to claim 1, wherein after the position of the mining machine with respect to said wall profile has changed in a predefined manner, said wall profile with respect to the machine is redetermined at this point, and the wall profile thus determined becomes the new reference profile used for determination of the position.

6. A method according to claim 5, including using the new wall surface profile as the reference profile after the mining machine has moved a predefined distance in the direction of travel.

7. A method according to claim 6, including determining the new wall surface profile after the mining machine has turned a predetermined angle from the direction of measurement of the original wall profile.

8. A method according to claim 5, including determining the new wall surface profile after the mining machine has turned a predetermined angle from the direction of measurement of the original wall profile.

9. A method according to claim 8, including measuring the turning angle of the mining machine with a gyroscope provided in the machine.

10. A method according to claim 1, including measuring the position of the mining machine by means of the rotary motion of the wheels and the direction of travel as soon as the machine starts moving in the return direction.

11. A method according to claim 1, including determining said wall surface profiles by a laser scanner.

12. A method according to claim 1, including measuring said wall surface profiles by a video camera and a computer connected thereto.

13. A method according to claim 1, including determining the position of a mining machine arranged to move automatically along a predetermined route.

14. A method according to claim 1, including storing the profiles of the wall surfaces surrounding the route of the mining machine by driving the machine manually through said route, storing the wall surface profiles determined during the drive in a memory, and using the stored wall surface profiles as reference surfaces in determination of the position of the mining machine.

15. An apparatus for implementing the method according to claim 1, the apparatus comprising control means for controlling a mining machine, the control means including means for determining the position of the mining machine by measuring the rotary motion of the wheels and the direction of travel of the machine, and measuring means for determining profiles of wall surfaces surrounding the route of the machine at least at predetermined intervals and for storing the profiles in a memory, and means for comparing the wall surface profiles measured during the movement of the machine with the wall surface profiles stored in the memory and for correcting the data on the position of the mining machine on the basis of the position data obtained from the comparison of the wall surface profiles, wherein the apparatus includes at least one detector, detecting the operation of the transmission, the detector detecting skidding of at least one wheel with respect to the underlying surface, and the control means is arranged to interrupt the determination of the position of the machine by means of the rotary motion of the wheels and the direction of travel of the mining machine as soon as the detector detects the skidding, and correspondingly to determine the position of the machine solely by comparing the wall surface profiles obtained from the measuring means with the wall surface profiles stored in the memory.

16. An apparatus according to claim 15, including a gyroscope provided in the mining machine for measuring the direction in which the machine is turning and for taking the measured direction into account in determination of the position of the machine.

17. An apparatus according to claim 16, wherein the control means are arranged to determine said wall surface profile with respect to the position of the mining machine by means of the measuring means after the machine has moved a predefined distance forward with respect to said wall surface and/or turned an angle equaling a predetermined angle from the original direction of travel, and to store the obtained wall surface profile as the new reference profile in the memory of the control means.

18. An apparatus according to claim 15, wherein the control means are arranged to determine said wall surface profile with respect to the position of the mining machine by means of the measuring means after the machine has moved a predefined distance forward with respect to said wall surface and/or turned an angle equaling a predetermined angle from the original direction of travel, and to store the obtained wall surface profile as the new reference profile in the memory of the control means.

19. An apparatus according to claim 15, wherein said at least one detector comprises a sensor.

20. A method according to claim 1, wherein said detecting skidding step includes detecting skidding by a sensor.

* * * * *